3,303,015
HERBICIDAL COMPOSITION AND METHOD
Angelo J. Speziale, Creve Coeur, and Philip C. Hamm, Webster Groves, Mo., assignors to Monsanto Company, a corporation of Delaware
No Drawing. Filed Dec. 27, 1960, Ser. No. 78,236
5 Claims. (Cl. 71—2.5)

This application is a continuation-in-part of copending application Serial Number 787,380, filed January 19, 1959.

This invention relates to new and useful improvements in herbicides. More particularly this invention is concerned with novel herbicides and formulations thereof, and with methods of employing such materials to retard or completely eliminate the growth of noxious vegetation. Specifically, this invention involves the use of polysubstituted amino-s-triazines as both pre-emergent and contact herbicides.

The use of herbicides in agriculture has increased rapidly to the point where it is now common practice to treat the soil either before or shortly after a crop has been planted, or in some cases after plants have appeared above the ground but prior to appreciable plant growth, to retard or eliminate the growth of weeds. Mechanized weeding of a number of crops is limited since row weeding still necessitates the use of hand labor. Selective herbicides which can be applied to the planted rows to curtail or eliminate weeds while permitting the normal development of the crop would provide a tremendous impetus to the mechanization of the growing of cotton, legumes and many other crops. Certainly chemical weed control under any system of farming, whether mechanized or not, provides a means of assuring good crop development with significant savings on labor. The particular material employed must satisfy several requirements in order to justify its use as a selective herbicide. Lack of injurious effects on the agricultural crop is, of course, essential. Further, it is very important that the material render a high degree of weed control, even under adverse conditions, until the agricultural crop has developed to the stage where mechanical cultivation can be practiced.

Many compounds have been suggested and tried for the purposes set forth above, but their usefulness is most often limited by their failure to meet one or more of the requirements of a satisfactory herbicide. It has now been found that such requirements are satisfied by a group of polysubstituted amino-s-triazines of the structural formula

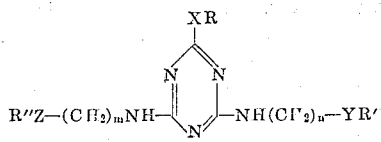

where X, Y and Z are each selected from oxygen and sulfur, R, R' and R" are each selected from alkyl having from 1 to 8 carbon atoms, and $n$ and $m$ are each integers from 1 to 6. The alkylene groups represented by both $(CH_2)_n$ and $(CH_2)_m$ can be either straight or branched chains.

The compounds having the above structural formula can be prepared by reacting a 2-chloro-4,6-bis(alkoxyalkylamino)-s-triazine, or the corresponding 2-chloro-4,6-bis(alkylthioalkylamino)-s-triazine, with a sodium alkoxide or mercaptide derived from metallic sodium and the desired alcohol or mercaptan. The reaction is conducted at temperatures above 20° C. and preferably under reflux conditions. The latter usually involves the use of temperatures from 50–100° C. for a period of from 2 to 3 hours.

The resulting reaction mixture generally consists of a colorless oil from which the excess alcohol or mercaptan is removed by evaporation. The residue is then dissolved in a suitable solvent, filtered, and the solvent evaporated leaving a colorless oil obtained in almost quantitative yield. In many instances the oil can be caused to crystallize by recrystallization from a suitable solvent. It is apparent that certain variations can be made, for example in the temperatures employed, depending upon the starting materials selected. In addition, the alkoxides and mercaptides of lithium, cesium and potassium can be substituted for those of sodium.

The following example, presented for the purpose of illustration only, will indicate the specific manner in which one of the triazines of this invention is prepared.

EXAMPLE I

*2-methylthio-4,6-bis(3-methoxypropylamino)-s-triazine*

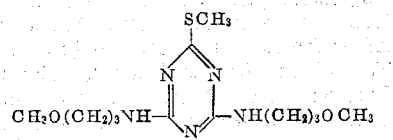

A three liter flask equipped with a stirrer, thermometer, ice-water condenser and gas sparger is charged with 1000 ml. of ethanol and 44 grams of 97% sodium hydroxide pellets. The pellets are dissolved by stirring, and the heat of solution raises the temperature to about 40° C. The solution is cooled to about 30° C., and 51 grams of methyl mercaptan is passed into the solution over a period of 15 minutes with cooling to maintain the 30° C. temperature. After all of the mercaptan is in, there is added 290 grams of 2-chloro-4,6-bis(3-methoxypropylamino)-s-triazine. The reactor is heated to reflux temperature over about 40 minutes and is then held at about 80° C. for 3 hours. 900 ml. of ethanol is distilled off while the temperature rises to about 90° C. The reaction mixture is then diluted with 900 ml. of cold water. When the temperature has dropped to 30° C., 100 ml. of ethylene dichloride is added to extract the product. An oil layer separates and is washed with water. The solvent is then removed by vacuum distillation. There is obtained 288 grams (95.6% of theory) of 2 - methylthio-4,6-bis(3-methoxypropylamino)-s-triazine. Analysis shows 23.61% nitrogen and 9.76% sulfur as against calculated values of 23.24% and 10.64% respectively.

Other and different compounds within the scope of this invention can be readily prepared in substantially the same manner. The details of several such preparations are set forth in our copending application Serial No. 787,380, filed January 19, 1959, of which the instant application is a continuation-in-part.

Among the specific compounds embodied in this invention are the following:

2-methoxy-4,6-bis(3-methoxypropylamino)-s-triazine
2-butoxy-4,6-bis(3-methoxypropylamino)-s-triazine
2-methoxy-4,6-bis(3-n-butoxypropylamino)-s-triazine
2-ethylthio-4,6-bis(3-methoxypropylamino)-s-triazine
2-octylthio-4,6-bis(3-methoxypropylamino)-s-triazine
2-octylthio-4,6-bis(5-butoxyamylamino)-s-triazine
2-butylthio-4,6-bis(6-octohexylamino)-s-triazine
2-methoxy-4,6-bis(3-octylthiopropylamino)-s-triazine
2-butylthio-4,6-bis(3-methylthiobutylamino)-s-triazine
2-octylthio-4,6-bis(4-propylthiobutylamino)-s-triazine
2-ethoxy-4,6-bis(6-butylthiohexylamino)-s-triazine
2-propoxy-4,6-bis(octoxymethylamino)-s-triazine
2-butoxy-4,6-bis(2-methylthioethylamino)-s-triazine
2-hexoxy-4,6-bis(4-pentoxybutylamino)-s-triazine
2-methoxy-4,6-bis(butylthiomethylamino)-s-triazine
2-methylthio-4,6-bis(3-n-butoxypropylamino)-s-triazine
2-octoxy-4,6-bis(6-ethoxyhexylamino)-s-triazine
2-butoxy-4,6-bis(ethylthiomethylamino)-s-triazine
2-ethoxy-4,6-bis(propoxymethylamino)-s-triazine
2-octoxy-4,6-bis(3-octylthiopropylamino)-s-triazine
2-octylthio-4,6-bis(5-butoxyamylamino)-s-triazine
2-methoxy-4,6-bis(3-butylthioamylamino)-s-triazine
2-butylthio-4,6-bis(2-octoxyethylamino-s-triazine
2-heptoxy-4,6-bis(3-octylthiopropylamino)-s-triazine
2-hexylthio-4,6-bis(3-ethoxypropylamino)-s-triazine
2-hexoxy-4,6-bis(3-amylthiobutylamino)-s-triazine
2-methylthio-4,6-bis(4-heptoxybutylamino)-s-triazine;

and the like.

The polysubstituted amino-s-triazines of this invention are useful for selectively inhibiting the germination and pre-emargent growth of grasses from seeds in contact with soil. The relative activity of such triazines is demonstrated by the test data hereinafter set forth.

Aluminum pans were filled level with a good grade of top soil which had been screened through ¼" wire mesh. The soil surface was then compacted to a depth of ⅜" from the top of the pan. A predetermined number of seeds of each of morning glory, wild oats, brome grass, rye grass, buckwheat, radish, sugar beet, cotton, corn, foxtail, barnyard grass, crab grass, field bindweed, pigweed, wild buckwheat, tomato and sorghum were then scattered on the soil surface. The seeds were covered with soil to the pan top.

The planted pans were sprayed with an aliquot of an organic solvent containing the chemical to be tested. The tests were made at rates equivalent to 25 lbs. per acre and 5 lbs. per acre. After spraying, the pans were placed on sand in a bench in a greenhouse, and the bench was flooded with water to ½" above the sand level. The pans of soil were permitted to absorb moisture through perforations in the pan bottoms until the surface was about one-half moist. The excess water was then drained from the bench. The surface of the test pans rapidly became completely moist through capillary action. They were maintained in this condition by sub-irrigation for a two week period. At the end of said period the number of plants of each spieces which germinated and grew were counted.

The relatve value of each compound tested with respect to its herbicidal effect on each plant species is indicated by the following numerical code:

\*—not tested
I—phytotoxic to up to 25% of species
II—phytotoxic to from 25 to 50% of species
III—phytotoxic to from 50 to 75% of species
IV—phytotoxic to from 75 to 100% of species Each of the test compounds in said table is designated by letter as follows:

A=2-methylthio-4,6-bis(3-methoxypropylamino)-s-triazine
B=2-ethylthio-4,6-bis(3-methoxypropylamino)-s-triazine
C=2-butoxy-4,6-bis(3-methoxypropylamino)-s-triazine
D=2-methoxy-4,6-bis(3-methoxypropylamino)-s-triazine

TABLE I

| Plant | Rate, lbs./acre | Extent of Phytotoxicity | | | |
|---|---|---|---|---|---|
| | | A | B | C | D |
| Morning Glory | 25 | I | III | IV | IV |
| Do | 5 | II | I | I | IV |
| Wild Oats | 25 | I | IV | IV | IV |
| Do | 5 | I | II | III | I |
| Brome Grass | 25 | I | * | * | IV |
| Do | 5 | II | * | IV | IV |
| Rye Grass | 25 | II | III | III | IV |
| Do | 5 | I | III | I | II |
| Buckwheat | 25 | * | * | * | IV |
| Do | 5 | * | * | * | IV |
| Radish | 25 | I | IV | IV | IV |
| Do | 5 | I | IV | I | II |
| Sugar Beet | 25 | II | IV | IV | IV |
| Do | 5 | I | IV | I | III |
| Cotton | 25 | * | * | * | III |
| Do | 5 | * | * | * | I |
| Corn | 25 | * | * | * | IV |
| Do | 5 | * | * | * | I |
| Foxtail | 25 | * | * | * | IV |
| Do | 5 | * | * | * | III |
| Barnyard Grass | 25 | III | IV | II | IV |
| Do | 5 | II | IV | I | IV |
| Crab Grass | 25 | IV | IV | IV | IV |
| Do | 5 | IV | IV | III | IV |
| Field Bindweed | 25 | * | * | * | IV |
| Do | 5 | * | * | * | I |
| Pigweed | 25 | IV | IV | IV | IV |
| Do | 5 | III | IV | I | IV |
| Wild Buckwheat | 25 | III | IV | IV | * |
| Do | 5 | II | IV | III | * |
| Tomato | 25 | IV | IV | II | * |
| Do | 5 | III | IV | I | * |
| Sorghum | 25 | * | III | II | * |
| Do | 5 | * | I | I | * |

While the foregoing data clearly illustrates that the compounds of this invention are useful and effective pre-emergent herbicides, it should further be noted that such compounds also display valuable contact herbicidal activity. To demonstrate this latter activity, a number of flats were prepared containing 21 day old specimens of various grasses and broadleaf plants. The compounds to be tested were either dissolved in a suitable solvent and sprayed onto the plants, or were applied to the plants in a solution of a wettable dust base consisting of a wetting agent and some diluent like a clay plus an amount of water to provide the desired fluidity for spraying. Fourteen days after application of a test compound, the condition of the plants was noted. The concentrations of herbicide to solvent or diluent were such that the percent concentration can be readily converted to pounds of herbicide per acre as follows:

TABLE II

| Percent concentration: | Pounds per acre |
|---|---|
| 0.5 | 9.0 |
| 0.2 | 3.6 |
| 0.1 | 1.8 |
| 0.05 | 0.9 |
| 0.04 | 0.72 |
| 0.02 | 0.36 |
| 0.01 | 0.18 |

The results of the contact activity tests are tabulated below, and the extent of injury is indicated by the following code:

\*=not tested
D=dead
S=severe
M=moderate
SL=slight

TABLE III.—2-METHOXY-4,6-BIS(3-METHOXYPROPYL-AMINO)-s-TRIAZINE

| Plant | Percent Concentration | | |
|---|---|---|---|
| | 0.1 | 0.05 | 0.01 |
| Grass | S | S | M |
| Bean | S | M | SL |
| Broadleaf | D | S | S |
| Corn | SL | None | None |
| Cotton | D | * | S |
| Beet | D | * | S |
| Radish | D | * | S |
| Wild Buckwheat | D | * | D |
| Rye Grass | D | * | M |
| Wild Oats | D | * | S |
| Crab Grass | M | * | SL |
| Morning Glory | D | * | S |

TABLE IV.—2-BUTOXY-4,6-BIS(3-METHOXYPROPYL-AMINO)-s-TRIAZINE

| Plant | Percent Concentration | | |
|---|---|---|---|
| | 0.50 | 0.20 | 0.05 |
| Grass | M | S | S |
| Bean | M | S | M |
| Broadleaf | S | D | S |
| Corn | None | S | M |
| Beet | S | * | * |
| Radish | S | * | * |
| Wild Buckwheat | D | D | D |
| Rye Grass | SL | M | SL |
| Wild Oats | M | D | S |
| Crab Grass | M | D | S |
| Morning Glory | D | D | S |

TABLE V.—2-METHOXY-4,6-BIS(3-n-BUTOXYPROPYL-AMINO)-s-TRIAZINE

| Plant | Percent Concentration | | |
|---|---|---|---|
| | 0.50 | 0.20 | 0.05 |
| Grass | D | M | None |
| Bean | S | S | M |
| Broadleaf | D | D | M |
| Corn | * | None | * |
| Rye Grass | * | None | * |
| Wild Oats | * | D | * |

TABLE VI.—2-ETHYLTHIO-4,6-BIS(3-METHOXYPROPYL-AMINO)-s-TRIAZINE

| Plant | Percent Concentration | | | | | |
|---|---|---|---|---|---|---|
| | 0.50 | 0.20 | 0.05 | 0.04 | 0.02 | 0.01 |
| Grass | D | D | D | S | M | None |
| Bean | D | D | D | M | M | S |
| Broadleaf | D | D | D | D | D | M |
| Corn | * | SL | None | None | None | None |
| Rye Grass | * | * | * | M | * | * |
| Wild Oats | * | * | * | SL | * | * |
| Crab Grass | * | * | * | D | * | * |
| Morning Glory | * | * | * | * | * | S |

TABLE VII.—2-METHYLTHIO-4,6-BIS(3-METHOXYPROPYL-AMINO)-s-TRIAZINE

| Plant | Percent Concentration | | | |
|---|---|---|---|---|
| | 0.5 | 0.2 | 0.05 | 0.01 |
| Grass | D | D | S | SL |
| Broadleaf | D | D | D | SL |
| Morning Glory | * | D | D | * |
| Wild Oats | * | S | SL | * |
| Brome Grass | * | D | SL | * |
| Rye Grass | * | D | SL | * |
| Radish | * | D | D | * |
| Sugar Beet | * | D | SL | * |
| Foxtail | * | D | SL | * |
| Crab Grass | * | D | SL | * |
| Pigweed | * | D | D | * |
| Soybean | * | D | S | * |
| Buckwheat | * | D | D | * |
| Tomato | * | D | D | * |
| Sorghum | * | S | * | * |
| Bindweed | * | D | * | * |

TABLE VIII.—2-METHYLTHIO-4,6-BIS(4-n-BUTOXYPROPYL-AMINO)-s-TRIAZINE

| Plant | Percent Concentration | | | |
|---|---|---|---|---|
| | 0.5 | 0.2 | 0.05 | 0.01 |
| Grasses [1] | S | S | SL | None |
| Broadleaf plants [2] | D | D | D | None |

[1] Includes wild oats, rye grass, crab grass, barnyard grass, and brome grass.
[2] Includes radish, sugar beet, pigweed, tomato, wild buckwheat, and morning glory.

In connection with all of the test data presented, it should be noted that controls were also run with untreated soil surfaces and unsprayed plants. At the end of the 14 day period, normal growth and/or development was observed.

Although the polysubstituted amino-s-triazines of this invention are useful per se in controlling a wide variety of plant growth, it is preferred that said triazines be applied to the plant parts and/or the plant growing medium in a dispersed form in a suitable extending agent.

In the instant specification and appended claims it is to be understood that the term "dispersed" is used in its widest possible sense. When it is said that the triazines of this invention are dispersed, it means that the particles of the triazines of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders, or dusts.

In the instant specification and appended claims it is to be understood that the expression "extending agent" includes any and all of those substances in which the polysubstituted amino-s-triazines of this invention are dispersed. It includes therefore, the solvents of a true solution, the liquid phase of suspensions, or emulsions and the solid phase of particulate solids, e.g. pellets, granules, dusts and powders.

The exact concentration of the triazines of this invention employed in combatting or controlling noxious vegetation can vary considerably provided the required dosage (i.e. herbicidal amount) thereof is supplied to the plant parts and/or to the plant growing medium. From a practical point of view, the manufacturer must supply the agriculturist with a low-cost concentrate, spray base or particulate solid base in such form that, by merely mixing with water, solid extender (e.g., powdered clay or talc) or other low-cost material available to the agriculturist at the point of use, he will have an easily prepared herbicidal spray or particulate solid. In such a concentrate composition, the triazine generally will be present in a concentration of 5 to 95 percent by weight, the residue being any one or more of the well-known herbicidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the triazines of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. and having a flash point above 80° F., particularly kerosene), mineral oils and the like.

The polysubstituted amino-s-triazines of this invention are preferably supplied to the plant parts and/or to the plant growing medium in the form of emulsions or suspensions. Emulsions or suspensions are prepared by dispersing the triazines of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary active substances which may be anion-active (or anionic), cation-active (or cationic), or non-ionizing or (non-ionic) which are described in detail in volume I and II of Schwartz, Perry and Berch's "Surface Active Agents and Detergents" (1958 Interscience Publishers, Inc., New York), and also in the November 1947 issue of Chemical Industries (pages 811–824) in an article entitled "Synthetic Detergents" by John W. McCutcheion and also in the July, August, September and October, 1952 issues of Soap and Sanitary Chemicals under the title "Synthetic Detergents." The disclosures of these articles with respect to surfactants, i.e. the anion-active, cation-active and non-ionizing capillary active substances are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water-soluble non-ionic surfactants be employed.

The polysubstituted amino-s-triazines of this invention can be dispersed by suitable methods (e.g. tumbling or grinding) in solid extending agents either of organic or inorganic nature and supplied to the plant parts and/or to the plant growing medium in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. bentonite. These mixtures can be used for herbicidal purposes in the dry form, or, by addition of water-soluble surfactants or wetting agents, the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of one or more water-soluble surfactants which lower the surface tension of water in the weight proportions of 0.1 to 15 parts of surfactant with sufficient of a triazine of this invention in an organic solvent to make 100 parts by weight. Such a concentrate is particularly adapted to be made into a spray for combatting various forms of noxious vegetation by the addition of water thereto. As illustrative of such a concentrate is an intimate mixture of about 28 parts by weight of 2-methylthio-4,6-bis(3-methoxypropylamino)-s-triazine in about 65 parts by weight of xylene and 7 parts by weight of a blend of anionic and non-ionic surfactants.

Another useful concentrate in the form of a wettable powder comprises about 25 parts by weight of 2-methylthio-4,6-bis(3-methoxypropylamino)-s-triazine, 5 parts by weight of a sodium alkyl aryl sulfonate, 3 parts by weight of sodium citrate, 2 parts by weight of disodium phosphate and sufficient attapulgus clay to make 100 parts by weight. Such a concentrate can be further extended with a solid extending agent for use in its dry form, or a stable aqueous suspension or dispersion can be prepared and employed as a spray.

Of the surfactants aforementioned in preparing the various emulsifiable, wettable or dispersible compositions or concentrates of this invention, the anionic and non-ionic surfactants are preferred. Of the anionic surfactants, those particularly preferred are the well-known water-soluble alkali metal alkylary sulfonates as exemplified by sodium decylbenzene sulfonate and sodium dodecybenzene sulfonate. Of the non-ionic surfactants, those particularly preferred are the water-soluble polyoxyethylene derivatives of alkylphenols (particularly such as octylphenol, isooctylphenol, nonylphenol and dodecylphenol) and the water-soluble polyoxyethyene derivatives of the mono-higher fatty acid esters of sorbitan containing 15 to 30 moles of ethylene oxide per mole of sorbitan mono-ester of alkylphenol.

From the foregoing discussion of formulations, and from the tabulations of activity data, it will be apparent that the herbicidal compounds of this invention can be effectively employed over an extremely wide range of concentrations. It has been shown that such compounds display significant herbicidal activity in concentrations as low as 0.01%. It is also apparent that higher concentrations up to about 95% by weight of the triazine can be formulated for purposes of subsequently preparing lesser concentrations. These highly concentrated formulations are also desirable to conserve storage space and facilitate handling.

The polysubstituted amino-s-triazines of this invention are effective when applied to plant parts and/or to the plant growing medium. As employed in this application, the term "plant parts" is intended to be inclusive of stems, branches, foliage, roots and germinant seeds of plants. Further, the term "plant growing medium" is inclusive of any substance or media in which vegetation may take root and grow, and encompasses not only earth but compost, manure, mulch, humus and sand and the like, adapted to support plant growth.

In all of the various dispersions described hereinbefore for herbicidal purposes, the active ingredient can be one or more of the compounds of this invention. The compounds of this invention can also be advantageously employed in combination with other pesticides, including, for example, nematocides, bacterocides, and insecticides. In this manner it is possible to obtain mixtures which are effective against a wide variety of pests and other forms of noxious life.

While this invention has been described with respect to certain embodiments, it is to be understood that it is not so limited and that variations and modifications thereof obvious to those skilled in the art can be made without departing from the spirit and scope thereof.

The embodiments of the invention in which an exclusive property or privilege is claimed are defined as follows:

1. The mehtod of selectively inhibiting the germination and growth of plants which comprises contacting plant parts with a growth inhibiting amount of a compound of the formula

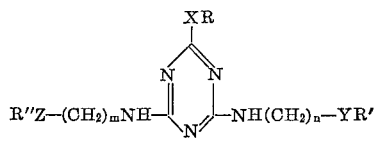

where X is selected from oxygen and sulfur, Y and Z are sulfur, R, R' and R'' are each an alkyl radical having from 1 to 8 carbon atoms, and $m$ and $n$ are each integers from 1 to 6.

2. A herbicidal formulation comprising a compound of the formula

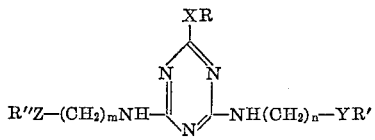

where X is selected from oxygen and sulfur, Y and Z are sulfur, R, R' and R'' are each an alkyl radical having from 1 to 8 carbon atoms, and $m$ and $n$ are each integers from 1 to 6, dispersed in an extending agent, said formulation containing from 0.01 to 95 percent by weight of said compound.

3. A concentrated herbicidal formulation comprising a compound of the formula

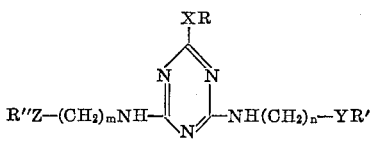

where X is selected from oxygen and sulfur, Y and Z are sulfur, R, R' and R'' are each an alkyl radical having from 1 to 8 carbon atoms, and $m$ and $n$ are each integers from 1 to 6, dispersed in an organic solvent therefor and having a minor amount of a surfactant dissolved therein, said concentrated formulation forming an emulsion with water upon agitation therewith, said concentrated formulation containing at least 5 percent by weight of the compound.

4. A herbicidal wettable powder comprising a compound of the formula

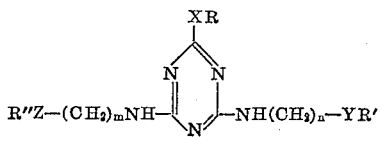

where X is selected from oxygen and sulfur, Y and Z are sulfur, R, R' and R'' are each an alkyl radical having from 1 to 8 carbon atoms, and $m$ and $n$ are each integers from 1 to 6, dispersed in a solid extending agent and containing a minor amount of a surfactant, said powder containing from 5 to 95 percent by weight of said compound.

5. The method comprising applying to agricultural soil a compound of the formula

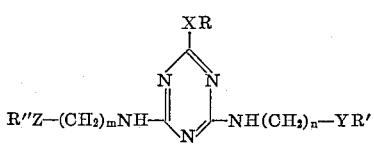

where X is selected from oxygen and sulfur, Y and Z are sulfur, R, R' and R'' are each an alkyl radical having from 1 to 8 carbon atoms, and $m$ and $n$ are each integers from 1 to 6, said compound being applied at the rate of from about 0.2 to 25 pounds per acre.

References Cited by the Examiner

UNITED STATES PATENTS

| | | | |
|---|---|---|---|
| 2,420,157 | 5/1947 | West | 260—249.6 |
| 2,426,770 | 9/1947 | Grim | 260—249.6 X |
| 2,959,519 | 11/1960 | Speziale et al. | 260—249.8 X |
| 3,022,150 | 2/1962 | Weed | 71—2.5 |
| 3,037,853 | 6/1962 | Luckenbaugh | 71—2.5 |
| 3,185,561 | 5/1965 | Acker | 71—2.5 |

FOREIGN PATENTS

| | | |
|---|---|---|
| 565,827 | 7/1958 | Belgium. |
| 880,433 | 12/1942 | France. |
| 1,135,848 | 12/1956 | France. |
| 222,719 | 11/1942 | Switzerland. |

OTHER REFERENCES

Koopman et al.: Rec. Tran. Chim. Col. 77, pages 234 to 240 (1958).

Koopman: "Nievwe Herbicide 1, 3, 5 Triazine Derivaten," Vilgevery Excelsior-Oranjeplein 96-'S-Gravenhage, May 31, 1957, pages 7 to 63 (pages 10, 11, 15, 46 and 59 particularly relied on).

JAMES O. THOMAS, JR., *Acting Primary Examiner.*

MAURICE A. BRINDISI, *Examiner.*

JAMES O. THOMAS, JR., *Assistant Examiner.*